Oct. 26, 1926.
C. JOHNSON
1,604,168
SANDING DEVICE FOR VEHICLES
Filed Feb. 10, 1925 2 Sheets-Sheet 1
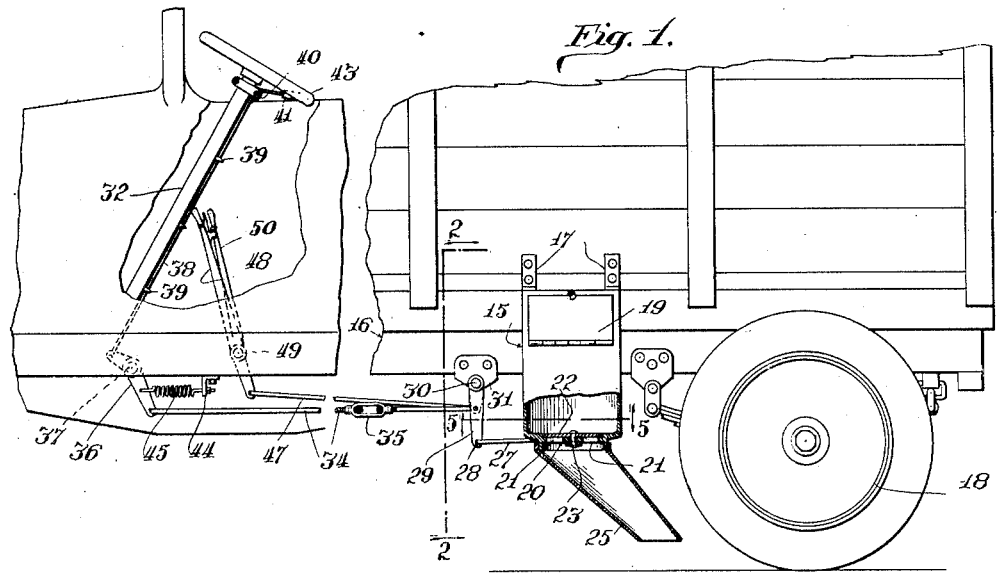
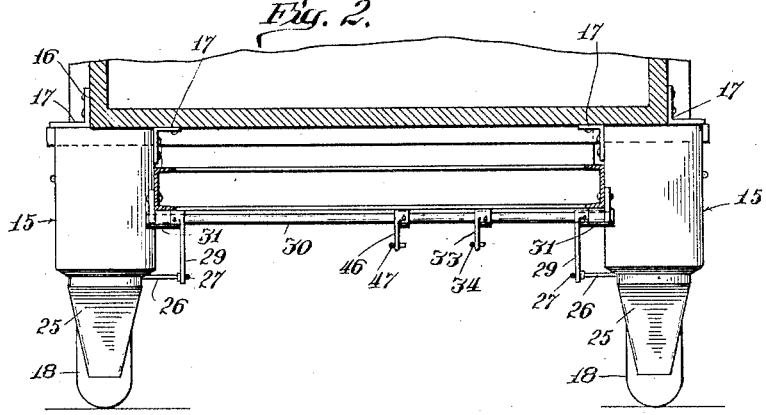
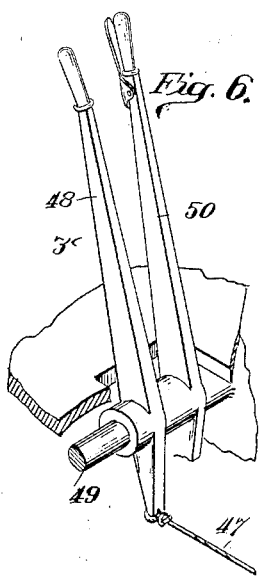
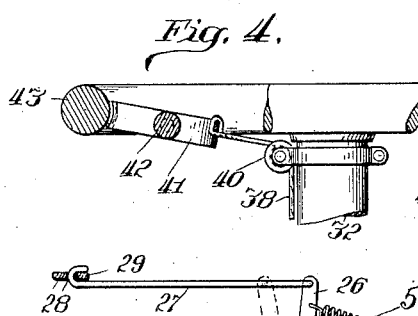
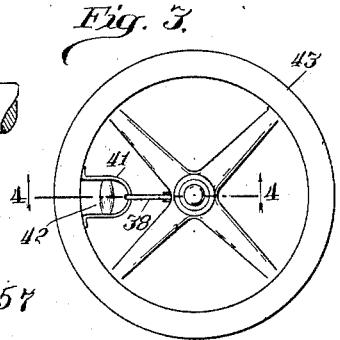
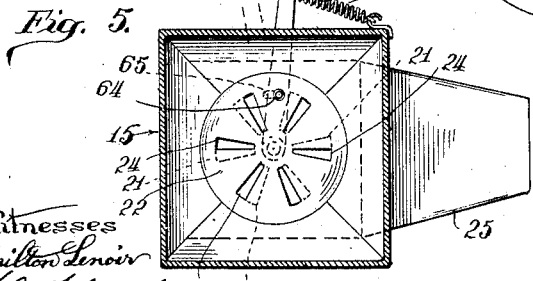
Inventor
Clarence Johnson,
By George Heidman
Attorney.
Witnesses
Milton Lenoir
G. A. Florell Oct. 26, 1926.
C. JOHNSON
SANDING DEVICE FOR VEHICLES
Filed Feb. 10, 1925    2 Sheets-Sheet 2
1,604,168
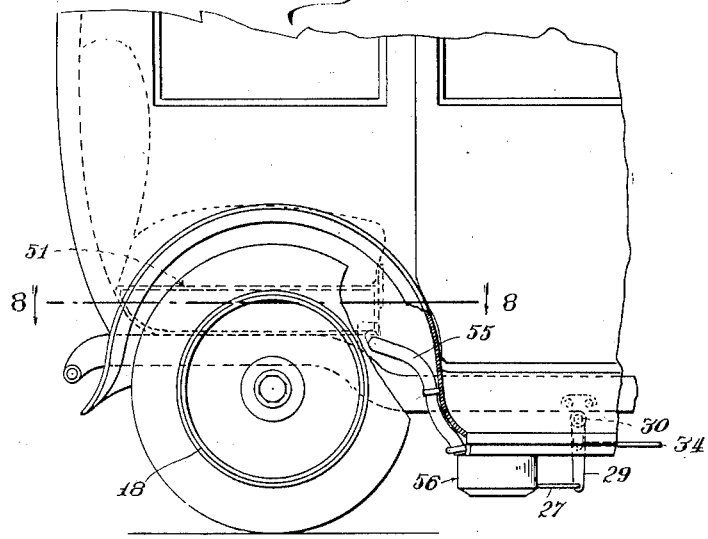
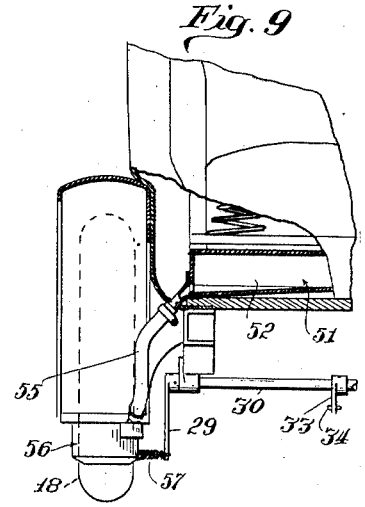
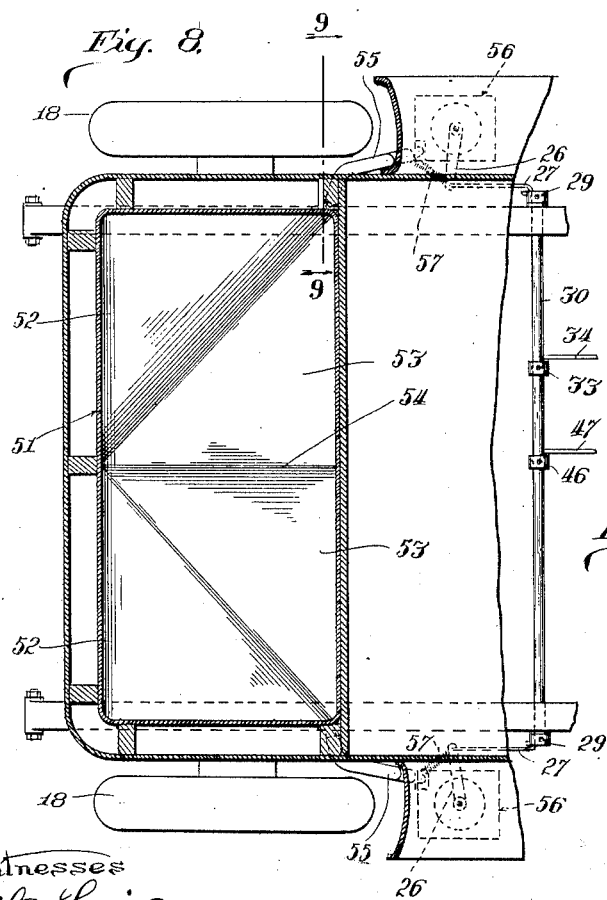
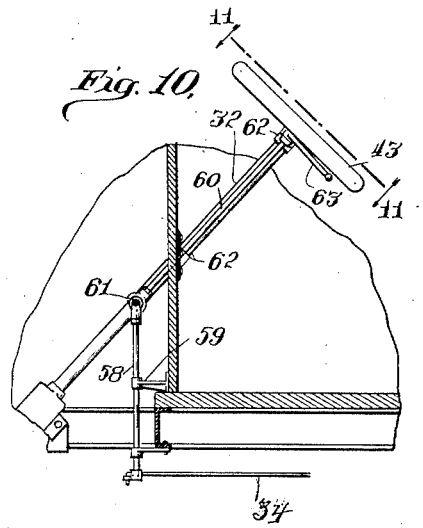
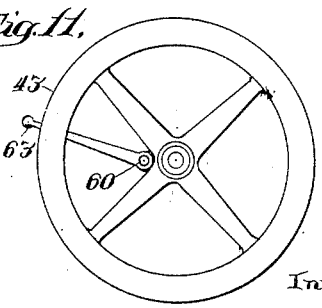
Inventor
Clarence Johnson,
By George Heidman
Attorney.

Patented Oct. 26, 1926.

1,604,168

UNITED STATES PATENT OFFICE.

CLARENCE JOHNSON, OF CHICAGO, ILLINOIS.

SANDING DEVICE FOR VEHICLES.

Application filed February 10, 1925. Serial No. 8,098.

My invention relates to a sanding device more especially intended for motor driven vehicles, namely automobiles, trucks and the like; the invention having for its object the provision of a device which may be readily installed on an automobile or truck and which may be controlled by means operable from the seat of the driver, whereby a suitable quantity of sand will be scattered forward of the rear or driving wheels of the automobile or truck in order to provide traction when slippery road conditions are encountered.

The objects and advantages of my invention will be more readily comprehended from the detailed description of the accompanying drawings, wherein:

Figure 1 illustrates the application of my invention to a motor driven truck of which a portion is shown in side elevation, with certain portions broken away, and a part of my device shown in sectional elevation.

Figure 2 is a vertical sectional view, taken substantially on the line 2—2 of Figure 1 looking in the direction of the arrows.

Figure 3 is a detail plan view of the steering wheel with a portion of the control mechanism.

Figure 4 is a detail sectional view on the line 4—4 of Figure 3.

Figure 5 is a detail sectional view taken substantially on the line 5—5 of Figure 1 looking in the direction of the arrows.

Figure 6 is a detail perspective view of the emergency brake lever and additional lever for controlling the sanding mechanism.

Figure 7 illustrates the application of my invention to an automobile, a portion whereof is shown in elevation with parts broken away; my improved means being partially shown in dotted lines beneath the automobile body.

Figure 8 is a cross sectional view taken substantially on the line 8—8 of Figure 7 looking downwardly.

Figure 9 is a detail vertical sectional view taken substantially on the line 9—9 of Figure 8.

Figure 10 is a detail sectional view of the steering column and wheel provided with my sander control mechanism.

Figure 11 is a plan view taken on the line 11—11 of Figure 10.

In the exemplification of the invention as disclosed in Figure 1 it has been shown applied to a truck, of which only a portion is shown in side elevation. The invention comprises receptacles 15, 15 of any suitable construction which are intended to be properly secured to the body 16 of the truck, as by brackets 17; that is to say a receptacle is to be secured to each side of the truck at a point slightly forward of the traction or rear wheels 18 of the truck.

The receptacles are each preferably provided with a suitable drop cover or lid 19 hingedly secured at the side of the receptacle, with the upper end suitably latched in place; and the receptacles are of a size adapted to contain a sufficient quantity of suitable sand. The receptacles are also each provided with a bottom 20, which is preferably provided with a number of suitable sized openings as at 21 in Figures 1 and 5 for the passage of the sand when the openings 21 have been uncovered by proper operation of a circular plate 22 which is pivotally mounted at the point 23 on the bottom 20; the inner bottom of the receptacle 15 being formed to permit the plate 22 to lie flush therewith. The circular plate 22 is also provided with a number of openings as at 24 (of equal number and of the same configuration as the openings in bottom 20) adapted to be brought into register with the openings 21 in the bottom 20 when plate 22 has been properly rotated.

The bottom of each receptacle is formed or provided with a tapered and somewhat rearwardly sloping spout or conduit 25, terminating at a suitable distance above the ground and forward of the rear or traction wheels of the truck; the spouts or conduits 25 having orifices formed to discharge the sand in a spreading manner forwardly of the wheels.

The pivot pin 23 of the plate 22 of each receptacle is provided with an arm 26 extending laterally through a suitable opening in the side of the bottom portion or spout of the receptacle. The arm 26 has a link 27 pivotally connected thereto. It will be understood that the plates 22 of both receptacles 15 are so arranged as to have the arms 26 thereof extend inwardly or toward the longitudinal center line of the truck. Each link 27 is in turn pivotally connected at 28 to an arm 29 which is rigidly secured to a rocker shaft 30 mounted in suitable brackets 31 secured to the side frame members of the chassis; the arms 29 being secured to the rocker shaft 30 so as to rotate therewith.

The rocker shaft 30, at a point preferably somewhat in alignment with the steering column 32 of the truck, is provided with a short arm 33 rigidly secured thereto and the lower end of this arm in turn is connected to a reach-rod 34, which may be provided with a turn-buckle connection as at 35 to permit of adjustments. The forward end of the reach-rod 34 is pivotally connected in the depending arm of a bell-crank lever 36 which latter is oscillatable on a stud or rod 37 secured on the frame of the truck in any suitable manner. The other arm of the bell-crank lever 36 has a pull-rod or wire 38 secured thereto; and this pull-rod or wire is disposed lengthwise of the steering post and held in position by suitable clips 39. The wire or rod 38 passes over a small roller 40 secured to the upper end of the post and is secured to a flexible or leather loop or strap 41, the ends whereof are suitably secured to the steering wheel. The loop or strap 41, at an intermediate point, is provided with a grip 42 arranged in close proximity to the wheel so that it may readily be grasped by the fingers of the operator without removing his entire hand from the wheel 43.

As is apparent from the construction shown, an outward pull on grasp 42 will exert an upward pull on rod or wire 38 thereby rocking bell-crank lever 36 so as to move the depending arm thereof forwardly and this in turn will exert a pull on pull rod 34 thereby rocking shaft or rod 30 and with it the two links or arms 29 at opposite ends of the rod and at opposite sides of the truck. Such actuation of the rocker shaft will move the links or arms 29 forwardly thereby exerting a forward pull on links 27 which will cause the apertured plates 22 of both receptacles 15 to be rotated so as to cause the apertures 24 in each plate 22 to be brought into register with the openings 21 in the bottom of each receptacle. This will allow a quantity of the sand to pass through the registering openings, down into the spouts 25, to be discharged forward of the rear or traction wheels 18 of the truck.

The truck frame at a suitable point is shown provided with a bracket or lug as at 44 to which one end of a tension spring 45 is secured, while the other end of the spring is secured to the depending arm of the bell-crank lever. The spring 45 normally tends to draw the depending arm of the bell-crank lever rearwardly and therefore in a direction which will induce the pull-rod 34 to rock the rocker shaft 30 with its arms 29 in a direction which will cause the links 27 and arms 26 to move the apertured plates 22 back to normal position, namely in a direction which will move the apertures 24 of each plate 22 out of register with the openings 21 in the bottom of each receptacle and thereby shut off the outflow of sand.

The rocker shaft 30 is also shown provided with a second arm 46 to which a rod or wire 47 is pivotally secured. The rod or wire 47 is also secured to the lower end of a lever 48 which is pivotally mounted in the underframe of the truck and preferably on the same fulcrum point or cross-rod 49 of the usual emergency brake lever 50, see Figure 6, so as to be grasped at the same time and with the same hand of the operator when occasion for a quick or short stop arises.

As is apparent from the construction shown and described, the sanding operation may be accomplished either by exerting a pull on the grasp 42 on the steering wheel, or by operation of the lever 48 when the operator is called upon to use his emergency brake.

In Figures 7 to 11, I illustrate the application of my invention to an automobile. Where my improved device is intended to be applied to an automobile, the supporting structure of the rear seat is formed to provide a receptacle 51 which preferably extends full length of the rear seat. The receptacle is provided with downwardly sloping bottom walls 52 and 53; the wall 53 being bent downwardly from the median line 54 so as to slope in opposite directions and thus divide the receptacle into two sand holding compartments on opposite sides of the median line of the vehicle. The walls 52 and 53, in addition to sloping downwardly toward each other, are also made to slope downwardly toward the front side of the receptacle 51 so that the lowest point in both compartments will be at the juncture of the bottom walls 52 and 53 adjacent to the forward corners of the receptacle 51 and therefore adjacent to the sides of the vehicle. The forward corners of the receptacle are each provided with an outlet conduit 55 extending slightly forwardly and downwardly, as well as outwardly or in a lateral direction so as to be disposed forward of the rear wheels 18; a portion of the conduits 55 being preferably composed of hose or other flexible tubing.

The lower ends of the conduits are connected with upper ends of suitable receptacles 56 which may be secured beneath the fenders of the automobile. The receptacles 56 (one on each side of the automobile) may be comparatively shallow and of any suitable shape; with the bottoms arranged similar to the bottoms of the receptacles 15 previously described; namely with an apertured plate 22 pivotally mounted on the apertured bottom of the receptacle and provided with an arm 26 to which a rod or wire 27 is secured as in Figure 5. The arms 26 in Figures 5 and 8 are also each provided with a retracting spring 57 which returns the arm to normal position and therefore rotates the plates 22 in the receptacles so as to move the openings out of register, thereby shutting off further outflow of sand.

The wires or rods 27, like in Figure 1, are secured to the ends of links 29 secured to the ends of a rocker shaft 30, which, at suitable points, is also provided with the short arms 33 and 46, like in Figures 1 and 2. The arm 33 has the pull-rod or wire 34 secured thereto which is connected to a short laterally disposed arm or end of the vertically disposed rod 58 rotatably secured in place by means of brackets 59 forward of the panel or instrument board of the automobile. The upper end of rod 58 is connected to a rod 60 by means of a universal joint 61; the rod 60 being held against the side of the steering post 32 by suitable clips 62. The rod 60 extends to a point just beneath the steering or hand wheel 43 and has its upper end bent or provided with a laterally disposed end 63 arranged to extend immediately beneath the wheel and preferably slightly beyond the periphery thereof, as shown in Figure 11.

As is apparent from this construction slight oscillation of portion 63 causes rod 61 to be rotated, which in turn rotates rod 58, which will exert a pull on rod 52. This will cause rock-shaft 30 to be rotated and exert a forward movement of links or arms 29, which in turn will exert a pull on rods 27, against the action of springs 57, thereby cause the plates 22 in both receptacles 56 to be rotated so as to bring their openings into register with the openings in the bottoms of the receptacles 56 and allow sand to flow outwardly and be spread forwardly of the rear or traction wheels of the automobile.

The shaft 30, like in Figures 1 and 2, may also be provided with the second arm 46, which receives a rod 47 whose forward end may be secured to an auxiliary lever 48 secured adjacent to the emergency brake lever 50 as shown in Figure 6.

In order to ensure the proper registering of the openings in the respective plates 22 in all of the receptacles 15 or 56, I have shown the plate 22 of the receptacle provided with a pin as at 64 in Figure 5, which extends into a small arcuate slot 65. The slot 65 is of such size as to permit sufficient rotation of the plate 22 to bring the apertures in the plate into full or complete register with the apertures in the bottoms of the receptacles.

I have shown what I believe are simple adaptations of my invention to either a truck or an automobile and have described the exemplifications in terms employed merely as terms of description and not as terms of limitation, as structural modifications are possible and may be made without, however, departing from the spirit of my invention.

What I claim is:—

1. A sanding device of the character described comprising sand-holding compartments disposed at the rear end of the vehicle, each compartment being provided with a delivering end for conveying the sand to a point immediately forward of the rear wheels, rotatably mounted apertured plates for controlling the delivery ends of said compartments, means for returning the plates to normal position, a rocker shaft disposed transversely beneath and from side to side of the vehicle, each end of the rocker shaft being provided with an angularly disposed link operatively connected with the adjacent apertured plate, a spring-controlled bell-crank lever secured beneath the forward end of the vehicle, an adjustable reach-rod between the bell-crank lever and the rocker shaft, a pull wire secured to the bell-crank lever and slidably secured lengthwise of the steering column of the vehicle, and a hand grasp yieldingly mounted within the steering wheel intermediate of the rim of said wheel and the column and connected with said pull wire.

2. A sanding device of the character described comprising sand-holding compartments, each being provided with a delivery end for conveying the sand forward of the rear wheels, rotatably mounted apertured plates for controlling the delivery ends of the compartments, means for returning the plates to normal position, a rocker shaft rotatably mounted beneath and extending transversely from side to side of the vehicle, an angularly disposed link secured to each end of the rocker shaft and operatively connected with the adjacent apertured plate, a spring-controlled bell-crank lever secured beneath the forward end of the vehicle, an adjustable reach-rod between the bell-crank lever and the rocker shaft, a pull wire secured to the bell-crank lever and disposed lengthwise of the steering column of the vehicle, a hand grasp yieldingly mounted on the steering wheel intermediate of the rim and said column and connected with the pull wire, and an auxiliary lever pivoted adjacent to the emergency brake lever of the vehicle with the lower end thereof operatively connected with said rocker shaft.

CLARENCE JOHNSON.